United States Patent
Zaghib et al.

(10) Patent No.: US 9,240,596 B2
(45) Date of Patent: Jan. 19, 2016

(54) COMPOSITE ELECTRODE MATERIAL

(75) Inventors: Karim Zaghib, Longueuil (CA); Chiaki Sotowa, Omachi (JP); Abdelbast Guerfi, Brossard (CA); Masataka Takeuchi, Zama (JP); Patrick Charest, Sainte-Julie (CA)

(73) Assignees: HYDRO-QUEBEC, Montreal (CA); SHOWA DENKO K.K., Tokyo (JP)

( * ) Notice: Subject to any disclaimer, the term of this patent is extended or adjusted under 35 U.S.C. 154(b) by 250 days.

(21) Appl. No.: 13/003,851

(22) PCT Filed: Jul. 24, 2009

(86) PCT No.: PCT/CA2009/001025
§ 371 (c)(1),
(2), (4) Date: Jan. 12, 2011

(87) PCT Pub. No.: WO2010/012076
PCT Pub. Date: Feb. 4, 2010

(65) Prior Publication Data
US 2011/0123858 A1     May 26, 2011

(51) Int. Cl.
*H01M 4/48*     (2010.01)
*H01M 4/62*     (2006.01)
*C01D 15/02*    (2006.01)
*H01M 4/1397*   (2010.01)
*H01M 4/36*     (2006.01)
*H01M 4/58*     (2010.01)
*H01M 4/04*     (2006.01)

(52) U.S. Cl.
CPC ............... *H01M 4/625* (2013.01); *C01D 15/02* (2013.01); *H01M 4/0471* (2013.01); *H01M 4/1397* (2013.01); *H01M 4/362* (2013.01); *H01M 4/366* (2013.01); *H01M 4/5825* (2013.01); *H01M 4/0404* (2013.01); *H01M 4/623* (2013.01); *Y02E 60/122* (2013.01); *Y10T 428/292* (2015.01)

(58) Field of Classification Search
None
See application file for complete search history.

(56) References Cited

U.S. PATENT DOCUMENTS

| 6,489,026 B1 * | 12/2002 | Nishimura et al. ........... 428/367 |
| 6,855,273 B2   | 2/2005  | Ravet et al. |
| 2004/0033360 A1 | 2/2004 | Armand et al. |
| 2004/0202934 A1 | 10/2004 | Zaghib et al. |

(Continued)

FOREIGN PATENT DOCUMENTS

| CA | 2614634 A1 | 6/2009 |
| CN | 1478310 A  | 2/2004 |

(Continued)

OTHER PUBLICATIONS

Chinese Office Action issued in CN Application No. 200980129361.3, dated Nov. 29, 2012.

(Continued)

*Primary Examiner* — Cynthia K Walls
(74) *Attorney, Agent, or Firm* — Sughrue Mion, PLLC

(57) ABSTRACT

The invention relates to a composite material comprising carbon fibers and complex oxide particles, wherein the carbon fibers and the complex oxide particles have a carbon coating on at least part of their surface, said carbon coating being a non powdery coating The material is prepared by a method comprising mixing a complex oxide or precursors thereof, an organic carbon precursor and carbon fibers, and subjecting the mixture to a heat treatment in an inert or reducing atmosphere for the decomposition of the precursors The material is useful as the cathode material in a battery.

24 Claims, 4 Drawing Sheets

(56) References Cited

U.S. PATENT DOCUMENTS

| | | | |
|---|---|---|---|
| 2006/0222952 A1* | 10/2006 | Kono et al. | 429/231.95 |
| 2009/0186276 A1* | 7/2009 | Zhamu et al. | 429/221 |
| 2009/0305132 A1* | 12/2009 | Gauthier et al. | 429/207 |
| 2010/0119949 A1 | 5/2010 | Yano et al. | |
| 2010/0261061 A1 | 10/2010 | Yuasa et al. | |

FOREIGN PATENT DOCUMENTS

| | | |
|---|---|---|
| CN | 1681145 A | 10/2005 |
| CN | 1711376A A | 12/2005 |
| CN | 1790799 A | 6/2006 |
| CN | 1905265 A | 1/2007 |
| CN | 101145611 A | 3/2008 |
| JP | 2004178922 A | 6/2004 |
| JP | 2004186075 A | 7/2004 |
| JP | 2005135872 A | 5/2005 |
| JP | 2005158721 A | 6/2005 |
| JP | 2006302671 A | 11/2006 |
| JP | 2007048692 A | 2/2007 |
| JP | 2008277128 A | 11/2008 |
| KR | 2079280 B1 | 10/2002 |
| WO | 2006120332 A2 | 11/2006 |

OTHER PUBLICATIONS

Chinese Office Action issued in CN Application No. 200980129361.3, dated Jul. 22, 2013.

Japanese Office Action issued in JP Application No. 2011-520289, dated Oct. 1, 2013.

Communication dated Feb. 27, 2015 from the European Patent Office in corresponding European Application No. 09802302.1.

Bhuvaneswari M S et al: "Synthesis and characterization of Carbon Nano Fiber/LiFePO4 composites for Li-ion batteries", Journal of Power Sources, Elsevier SA, CH, vol. 180, No. 1, May 15, 2008, pp. 553-560, XP022612379, ISSN: 0378-7753, DOI: 10.1016/J.JPOWSOUR.2008.01.090.

Endo M et al: "Vapor-grown carbon fibers (VGCFs)—Basic properties and their battery applications", Carbon, Elsevier, Oxford, GB, vol. 39, No. 9, May 31, 2001, pp. 1287-1297, XP004319972, ISSN: 0008-6223, DOI: 10.1016/S0008-6223(00)00295-5.

* cited by examiner

COMPOSITE ELECTRODE MATERIAL

The present invention relates to a composite electrode material and to a method for the preparation thereof.

BACKGROUND

It is known to use composite electrodes in lithium batteries, wherein the composite electrode material comprises a complex oxide as the active material, a carbonaceous material as the electronic conducting and a binder.

U.S. Pat. No. 5,521,026 discloses a battery wherein the electrolyte is a solid polymer electrolyte, the anode is a lithium anode, and the cathode comprises a mixture of $V_2O_5$ and carbon black on a current collector. The composite cathode material is obtained by ball-milling the oxide and the carbon black in a liquid solvent, using stainless steel balls. Performances of such a battery are improved by ball-milling compared to a battery wherein the cathode components are simply mixed. However, using steel balls introduces impurities on the cathode material which leads to side reactions.

WO-2004/008560 describes a composite cathode material. Said cathode material is obtained by high energy milling a mixture of a non conducting or semi conducting material, a low crystallinity carbon (C1) and a high crystallinity carbon (C2). Carbon black is an example of low crystallinity carbon, and graphite is an example of high crystallinity carbon.

U.S. Pat. No. 6,855,273 describes a method for preparing an electrode material by heat treatment of a carbonaceous precursor in the presence of a complex oxide or the precursors thereof, in a controlled atmosphere. The electrode material thus obtained is made of complex oxide particles having a carbon coating and the conductivity thereof is substantially increased compared to the non coated oxide particles. The increased conductivity is due to the presence of the carbon coating which is chemically bonded to the oxide particle surface. The chemical bonds provide excellent adhesion and high local conductivity. The carbonaceous precursor may be a polymer precursor or a gaseous precursor. A composite electrode material is prepared by mixing the carbon coated particles with a carbon black, and PVDF as the binder. Carbon black must be added to the complex oxide particles when preparing the electrode to achieve a capacity of 170 mAh/g which is the theoretical capacity.

WO2004/044289 discloses a composite material obtained by mixing vapor grown carbon fibers with a matrix material, said matrix material being a resin, a ceramic or a metal, to enhance thermal conductivity and electrical conductivity.

US2003/0198588 discloses a battery wherein an electrode is made of a composite material comprising carbon fibers such as vapor grown carbon fibers. Carbon fibers exhibit a great intercalation property as a carbonaceous material for a negative electrode. A composite negative electrode material is prepared by kneading a mixture of carbon fibers and a binder.

SUMMARY

The present invention provides a method for preparing a composite material, the material thus obtained, and an electrode comprising said material.

The composite material of the invention comprises carbon fibers and complex oxide particles, wherein the carbon fibers and the complex oxide particles have a carbon coating on at least part of their surface, said carbon coating being a non powdery coating.

The method of the invention comprises mixing a complex oxide or precursors thereof, an organic carbon precursor and carbon fibers, and subjecting the mixture to a heat treatment.

DETAILED DESCRIPTION OF THE PREFERRED EMBODIMENTS

Figure 1:
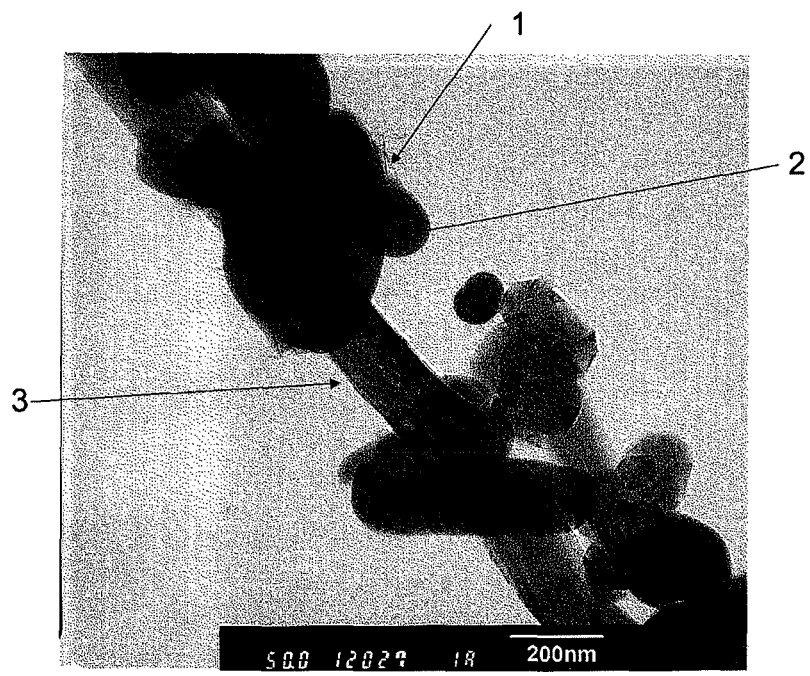
FIG. 1 shows a TEM image of the material of the invention.

The composite material of the invention comprises carbon fibers and complex oxide particles, wherein the carbon fibers and the complex oxide particles have a carbon coating on at least part of their surface, said carbon coating being a non powdery coating. The composite material comprises 70-99.8% complex oxide, 0.1-20% carbon fibers and 0.1-10% carbon coating, wherein all percentages are weigh %. The thickness of the carbon coating on the complex oxide particles and on the carbon fibers is generally less than 100 nm. The non powdery nature of said coating can be evidenced via transmission electron microscopy (TEM) or via Raman spectrometry.

In the composite material of the invention, the carbon coated complex oxide particles are nanosize particles supported by the carbon coated carbon fibers. The carbon coating of both the complex oxide particles and the carbon fibers provides a strong bonding of the particles and the fibers.

The complex oxide corresponds to the general formula $A_aM_mZ_zO_oN_nF_f$ wherein A represents one or more alkaline metals, M represents one or more transition metals, and optionally at least one non-transition metal, or mixtures thereof, and Z represents one or more non-metallic elements, wherein $a \geq 0$, $m \geq 0$, $z \geq 0$, $o \geq 0$, $n \geq 0$ and $f \geq 0$, the coefficients a, m, o, n, f and z being selected to ensure electro neutrality.

A represents preferably lithium.

M represents a transition metal element preferably selected from Fe, Mn, V, Ti, Mo, Nb, W, Zn and mixtures thereof, and optionally a non transition metal, preferably selected from Mg and Al.

Z represents a non metal preferably selected from P, S, Se, As, Si, Ge, B and mixtures thereof.

Non limiting examples of complex oxides include phosphate, oxyphosphate, silicate, oxysilicate, and fluorophosphate. $LiFePO_4$, $LiMnPO_4$, $LiFeSiO_4$, $SiO$, and $SiO_2$ are preferred complex oxides.

A carbon fiber consists of fiber filaments having a diameter of 1 to 200 nm and an aspect ratio (length/diameter) of 20 to 2000.

The composite material of the invention is prepared by mixing a complex oxide or precursors thereof, an organic carbon precursor and carbon fibers, and subjecting the mixture to a heat treatment in an inert or reducing atmosphere for the decomposition of the precursors.

The mixture is preferably prepared in an organic solvent. The solvent is preferably selected from organic liquid compounds which are able to dissolve the organic carbon precursor. Non limiting examples are isopropyl alcohol (IPA), heptane, acetone, or water. When the mixture is prepared in a solvent, the heat treatment comprises a first step of elimination of the solvent and a second step of decomposition of the precursors.

The organic carbon precursor may be selected from compounds which are in liquid state, or which are soluble in a solvent, or which are in liquid state upon the decomposition heat treatment, so that the precursor forms a uniform layer on the particles to be coated, which in turn provides a uniform carbon layer on the complex oxide particle. The heat treatment is performed at a temperature which provides pyrolysis or dehydrogenation or dehydrohalogenation of the organic carbon precursor.

The carbon precursor may be carbon monoxide pure or diluted in an inert gas, which provides a carbon coating upon disproportionation at a temperature lower than 800° C.

The carbon precursor may be a gaseous hydrocarbon which decomposes at moderate to high temperature to yield a carbon deposit. A hydrocarbon with low energy of formation is particularly suitable, for instance an alkene, an alkyne or an aromatic compound.

The organic carbon precursor may be an organic polymer which may have heteroatoms such as O, N, and F. Non limiting examples are polyoxyethylene or ethylene oxide copolymers, polybutadiene, polyvinyl alcohol, phenol condensation products (including those from a reaction with an aldehyde), polymers derived from furfurylic alcohol, polystyrene, polydivinylbenzene, polynaphtalene, polyperylene, polyacrylonitrile, and polyvinylacetate.

The organic carbon precursor may also be a hydrocarbon or a derivative thereof (like pitch, tar derivatives, perylene and derivatives thereof), or a polyhydric compound (like sugars, lactose, cellulose, starch, and esters or ethers thereof).

The carbon precursor may further be a compound having carbon-halogen bonds, which is decomposed at low or mid-range temperatures, lower than 400° C., by reduction of the carbon-halogen bonds according to the reaction —CY—CY—+2e$^-$→—C=C—+2Y$^-$ where Y is a halogen or a pseudo-halogen. Non limitative examples of such compounds are perhalocarbon compounds, such as hexachlorobutadiene or hexachlorocyclopentadiene or polymers thereof.

The carbon precursor may be a compound having —CH=CY bonds, which is decomposed at low or mid-range temperatures, lower than 400° C., by the reaction —CH—CY—+B→—C=C—+BHY where B is a base and Y is a halogen or a pseudo-halogen. Non limitative examples of such compounds are hydrohalocarbon compounds, such as polymers of vinylidene fluoride, vinylidene chloride or vinylidene bromide.

When the carbon precursor is a compound having carbon-halogen bonds or —CH=CY— bonds, a further heat treatment at a temperature of at least 710° C. is performed to carbonize the products resulting from the decomposition at 400° C.

In one embodiment, the composite electrode material is prepared from a mixture containing the complex oxide precursors, the carbon fibers and the organic carbon precursor. The complex oxide precursors, the organic carbon precursor and the carbon fibers are dissolved or homogeneously dispersed in a solvent, then the resulting homogeneous mixture is subjected to a first heat treatment at a temperature where the solvent is eliminated and to a second heat treatment at a temperature where the complex oxide precursors are reacted to form the complex oxide and the organic carbon precursor is carbonized.

In another embodiment, the composite electrode material is prepared from a mixture containing the complex oxide, the carbon fibers and the organic carbon precursor. The complex oxide, the organic carbon precursor and the carbon fibers are dissolved or homogeneously dispersed in a solvent, then the solvent is eliminated by evaporation, and the resulting homogeneous mixture is subjected to heat treatment at a temperature where the organic carbon precursor is carbonized. The complex oxide may be prepared by a hydrothermal process, starting from precursor compounds.

Carbon fibers may be obtained by a method comprising spraying a solution containing a carbon precursor and a transition metal into a reaction zone and subjecting the carbon source to thermal decomposition, heating the carbon fibers thus obtained in a non-oxidative atmosphere at a temperature between 800° C. to 1500° C., and further heating the carbon fibers in a non-oxidative atmosphere at 2000° C.-3000° C. More detailed information on the method for preparing vapor grown carbon fibers can be found in WO2004/044289. The second heat treatment of the carbon, at 2000-3000° C., cleans the surface of the fibers and results in increasing the adhesion of the carbon fibers to the carbon coating of the complex oxide particles. The carbon fibers thus obtained are so-called vapor grown carbon fibers.

Vapor grown carbon fibers are also commercially available from Showa Denko K.K. (Japan), under the trade name VGCF™.

A composite material according to the present invention is particularly useful as the active material of a composite electrode for electrochemical cells wherein the electrolyte is an ionic compound having lithium ions.

A method for preparing an electrode comprises:
  mixing a composite material of the invention, a binder and an organic solvent having preferably a low boiling point,
  applying the mixture thus obtained on a conductive support acting as the current collector, and eliminating the solvent by evaporation.

The binder may be selected from fluorine-based polymers, for example polyvinylidene fluoride (PVDF), polytetrafluoroethylene (PTFE), and from rubbers, for example a styrene butadiene rubber (SBR), or natural rubber.

In a preferred embodiment, the binder and the organic solvent are added to the composite material of the invention, in the form of a solution in an appropriate solvent. N-methyl-2-pyrrolidone is a solvent for a fluorine-based binder. Water is a solvent for a SBR rubber. The amount of binder added is selected to provide a mixture having preferably a viscosity lower than 106 Pa·s.

If the electrochemical cell is intended to be subjected to high discharge rates, the composite electrode material preferably contains about 5 wt % fibrous carbon in order to provide high discharge potential. If the electrochemical cell is intended to be subjected to low discharge rate, even a low fibrous carbon content allows high discharge potential.

The composite electrode material obtained on the current collector after evaporation of the solvent consists of carbon coated complex oxide particles, carbon coated carbon fibers and a binder, wherein the carbon coating of the complex oxide particles is strongly bonded to the complex oxide core of the particles, and the vapor grown carbon fibers are strongly bonded to the carbon coating, via a chemical C—C bonding. The complex oxide particles are preferably nanosize particles.

A composite electrode material according to the invention preferably contains from 0.5 to 20 wt % vapor grown carbon fibers. A carbon fiber content higher than 5 wt % does not provide further significant improvement of the electrode performances, but generates a higher cost.

In a preferred embodiment, the electrode material contains 0.5-5 wt % vapor grown carbon fibers, 70-95 wt % complex oxide and 1-25 wt % polymer binder, the total being 100%.

The composite material of the present invention has several advantages when it is used as the active material of a composite electrode.

The composite material of the invention has a high mechanical strength that is beneficial during intercalation and de-intercalation of lithium where volume change of the particles and the electrode occurs. The composite material is capable of adsorbing the volume change during charge/discharge of the cell.

In composite electrode materials consisting of nanoparticles of complex oxide particles, it is difficult to create a channel structure and a porosity which is suitable for an electrode, when the electrode is made by calendaring. The presence of the fibrous carbon in the composite material comprising nanoparticles creates a multi-channel structure, which improves the wetability of the material by a liquid electrolyte. Thus, the surface and the core of the particles are accessible to the electrolyte, which enhances the ionic conductivity locally on the particle.

As fibrous carbon has a high conductivity, there is no need to add another source of carbon in the composite electrode material.

Fibrous carbon increases conductivity locally at each particle and creates a conductive network in the electrode material. The higher conductivity yields high capacity (mAh/g) at high charge/discharge rates. In addition, high capacity is still achieved at low temperature, in particular at temperatures less than −20° C.

As small amounts of fibrous carbon are requested, an electrochemical cell containing the composite material as an electrode material has a higher energy by weight and volume.

The presence of fibrous carbon in a composite electrode material contributes to form a stable passivation layer on the surface of the electrode in an electrochemical cell having a solid electrolyte, so that the irreversible capacity loss (ICL) decreases. Furthermore, the presence of fibrous carbon like VGCF prevents agglomeration of the particles and helps to decrease the viscosity during the preparation of the mixture of the precursors.

The resistance of a composite electrode containing fibrous carbon is reduced, so that the voltage drop (IR) is very small, which provides lower volumetric specific impedance (VSI) and lower area specific impedance (ASI). These specifications are necessary for high-power applications such as power tools and hybrid electric vehicles.

A composite electrode of the invention is useful as the cathode of a rechargeable or non rechargeable battery having an electrolyte which comprises a lithium salt and an anode made of lithium, a lithium alloy or a compound capable of reversibly exchanging lithium ions.

According to a specific embodiment, a cathode of the invention is a multilayer cathode which comprises a aluminum collector, a first layer of a material according to the invention comprising carbon coated $LiFePO_4$ particles and carbon coated carbon fibers, and a second layer comprising a high energy cathode material selected for instance form like $LiCO_{1/3}Ni_{1/3}Mn_{1/3}O_2$, $LiMnNiO_2$, $LiMn_2O_4$, $LiMPO_4$ (M being Mn, Co or Ni). The presence of the first layer of $LiFePO_4$ increases the power and the safety of the battery.

In a preferred embodiment, the complex oxide is $LiFePO_4$ and the organic carbon precursor is a cellulose acetate. Carbonization heat treatment is performed at a temperature in the range of 600° C. to 750° C. under an inert or reducing atmosphere, to prevent formation of $Fe^{3+}$ compounds as impurities. An inert atmosphere may be argon or nitrogen. A reducing atmosphere may be a $N_2/H_2$ mixture, preferably containing not more than 4% $H_2$.

If the method of the invention is implemented starting from commercial $LiFePO_4$, or from $LiFePO_4$ prepared in a preliminary step, the method comprises the steps of:
- dissolving cellulose acetate in an appropriate solvent, for instance acetone,
- dispersing $LiFePO_4$ and carbon fibers in the solution obtained,
- heating at a temperature in the range of 600-750° C., for instance 710° C., under an inert or reducing atmosphere.

If the method of the invention is implemented starting from $LiFePO_4$ precursors, the method comprises the steps of:
- preparing a mixture of a carbon precursor, an iron precursor, a phosphorus precursor and carbon fibers in a solvent;
- heating the reaction mixture at 120° C. under vacuum to eliminate the solvent
- heating the dry mixture at a temperature in the range of 600-750° C., for instance 710° C., under an inert or reducing atmosphere.

The iron precursor may be selected from ferric oxide, magnetite, trivalent ferric phosphate, ferric hydroxyphosphate, trivalent ferric nitrate or mixtures thereof.

The lithium precursor may be selected from lithium oxide, lithium hydroxide, lithium carbonate, lithium hydroxyphosphate, neutral phosphate $Li_3PO_4$, acid phosphate $LiH_2PO_4$, lithium oxalate, lithium acetate and mixtures thereof.

The phosphorus precursor may be selected from phosphoric acid and its esters, neutral phosphate $Li_3PO_4$, acid phosphate $LiH_2PO_4$, monoammonium and diammonium phosphates, trivalent ferric phosphate, lithium hydroxyphosphate, and mixtures thereof.

It may be noted that some of the above precursors are precursors for more than one element.

The carbon precursor is preferably cellulose acetate.

The mixture of a carbon precursor, $LiFePO_4$ or precursors thereof and carbon fibers in a solvent can be prepared according to various procedures.

According to a first method, the mixture is prepared by dissolving cellulose acetate in an appropriate solvent, for instance acetone, and dispersing the $LiFePO_4$ precursors and carbon fibers in the cellulose acetate solution.

According to a second method, the mixture is prepared by a first step of dissolving cellulose acetate in solvent, and dispersing VGCF in the solution; and a second step of dispersing $FeSO_4$, LiOH and $H_3PO_4$ in the polymer solution which contains the carbon fibers.

According to a third method, the mixture is prepared by dissolving cellulose acetate in solvent, dispersing the $LiFePO_4$ precursors and the carbon fibers in a solvent, and mixing the polymer solution and the precursors and fiber solution.

According to a fourth method, the mixture is prepared by dissolving cellulose acetate in a solvent, dry mixing $FeSO_4$, LiOH, $H_3PO_4$ and the carbon fibers, and dispersing the powder mixture in the polymer solution. In the fourth method, dry mixing can be performed by jet milling, by ball milling, by mechanofusion, in a hydridizer, or in a mixer provided by Hosokawa Micron Corp. under the tradename Nobilta™.

EXAMPLES

The present invention is further explained by means of the following examples, to which it is however not limited.

In the examples, the composite materials were prepared starting from the following products:

$LiFePO_4$ a material consisting of $LiFePO_4$ particles, available from Phostech Lithium, Inc.;

VGCF™ fibrous carbon available from Showa Denko K. K. (Japan). The fiber diameter is 150 nm, the fiber length is about 10 μm, the specific area is 13 $m^2/g$, the electric conductivity is 0.1 mΩ·cm, and the purity is >99.95.

PVDF Polyvinyldifluoride available from Kureha (Japan).

SBR styrene butadiene rubber, available under the trade name BM400 from Zeon (Japan).

The obtained materials were analyzed by Scanning Electron Microscopy (SEM), Transmission Electron Microscopy (TEM) and X ray diffraction (XRD).

Example 1

In a first step, 9.0 g of lactose were dissolved in water, then 18.6 g of $Li_2CO_3$, 112.5 g of $FePO_4.2H_2O$, and 5 g of VGCF were added. In a second step, the reaction mixture was heated at 120° C. under controlled $N_2$ atmosphere over night to eliminate the solvent. In a third step, the dry mixture was fired at a 710° C., under a nitrogen atmosphere.

The powdery composite material thus obtained was evaluated in a coin cell (size 2032) as the cathode material. In the coin cell, the anode is a lithium foil and the electrolyte is a microporous polypropylene sheet impregnated by a 1M solution of $LiPF_6$ in a 7:3 mixture of ethylene carbonate (EC) and dimethyl carbonate (DEC) (UBE Japan). The electrode preparation and sealing were performed in dry air.

The cathode was prepared by mixing the composite powdery material with a polyvinylidene difluoride (PVDF) binder in a weight ratio of 92:8, blending the mixture with N-methylpyrrolidone (NMP) to obtain a slurry, coating the slurry on an aluminum collector, and drying the coated slurry over night under vacuum at 110° C.

The coin cell was cycled at constant current at a C/24 discharge rate (charge and discharge over 24 hours) between 2 V and 4 V.

FIG. 1 shows a TEM image of the material obtained. "1" designates the carbon coating, "2" designates a $LiFePO_4$ particle and "3" designates a carbon fiber.

Figure 2:
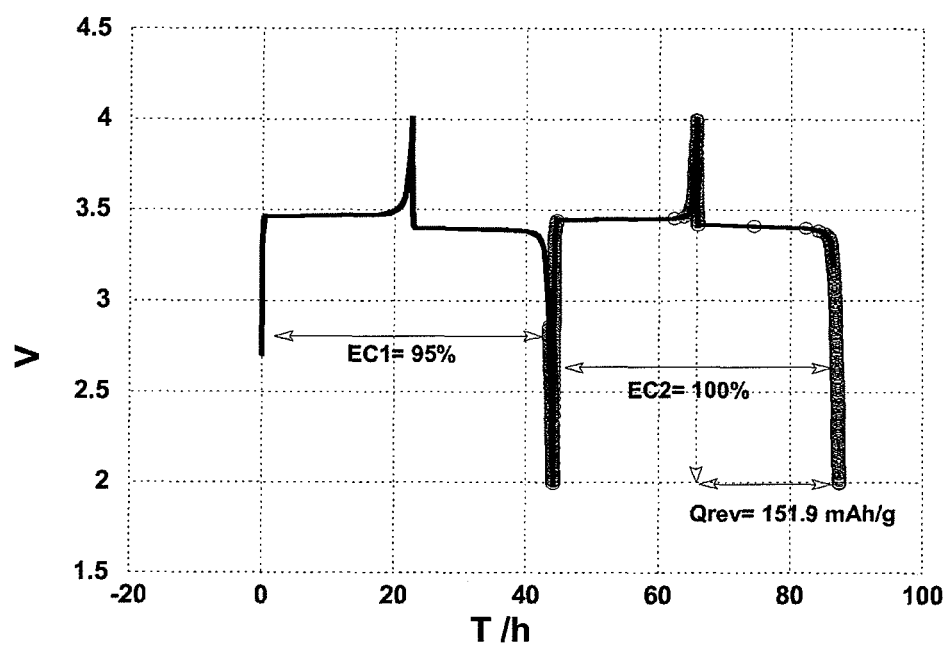
FIG. 2 shows the voltage profile V (in volts), as a function of charge-discharge time T (in hours) of the first and second cycles, for a material of the invention represented on FIG. 1.

FIG. 2 shows the voltage profile as a function of charge-discharge time of the first and second cycles. This profile shows, at C/24:
 in the first cycle, the coulombic efficiency EC1 is 95%;
 in the second cycle, the coulombic efficiency EC2 is 100%.
  and the reversible specific capacity Qrev is 151.9 mAh/g.

Example 2

In a first step, 3.56 g of cellulose acetate were dissolved in acetone, then 9.3 g of $Li_2CO_3$, 56.3 g of $FePO_4.2H_2O$, and 2.5 g of VGCF were added. In a second step, the reaction mixture was heated at 120° C. under controlled $N_2$ atmosphere over night to eliminate the solvent. In a third step, the dry mixture was fired at a 710° C., under a nitrogen atmosphere.

A coin cell was assembled in the same way as in example 1. The coin cell was cycled at constant current at C/24 regime between 2 V and 4 V.

Figure 3:
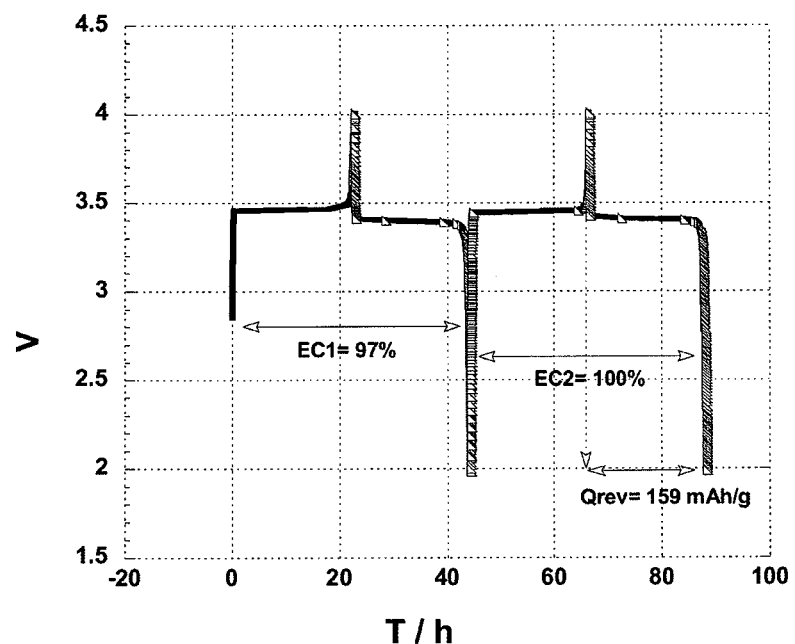
FIG. 3 shows the voltage profile V (in volts) as a function of charge-discharge time T (in hours) of the first and second cycles, for another material of the invention.

FIG. 3 shows the voltage profile as a function of charge-discharge time of the first and second cycles. This profile shows, at C/24:
 in the first cycle, the coulombic efficiency EC1 is 97%;
 in the second cycle, the coulombic efficiency EC2 is 100% and the reversible specific capacity is 159 mAh/g.

Example 3

Comparative

A mixture of 94 g $LiFePO_4$, 3 g carbon black and 3 g graphite were dispersed mechanically using a Nobilta™ mixer. The mixed powder thus obtained was used to prepare a positive electrode and a coin cell was assembled in the same way as in example 1.

The coin cell was cycled at constant current at C/24 regime between 2 V and 4 V.

Figure 4:
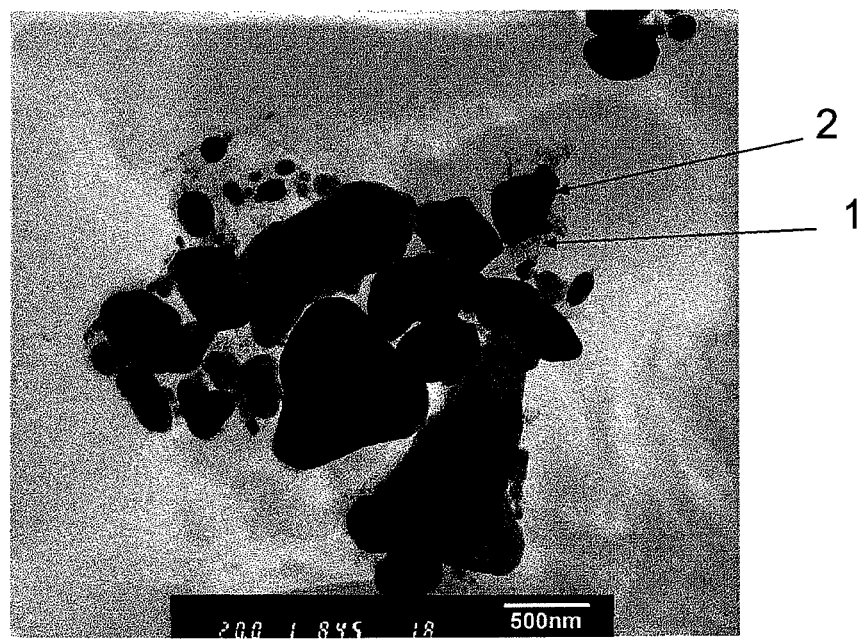
FIG. 4 shows a TEM image of a prior art material.

FIG. 4 shows a TEM image of the material obtained. "1" designates the carbon coating, and "2" designates a $LiFePO_4$ particle.

Figure 5:
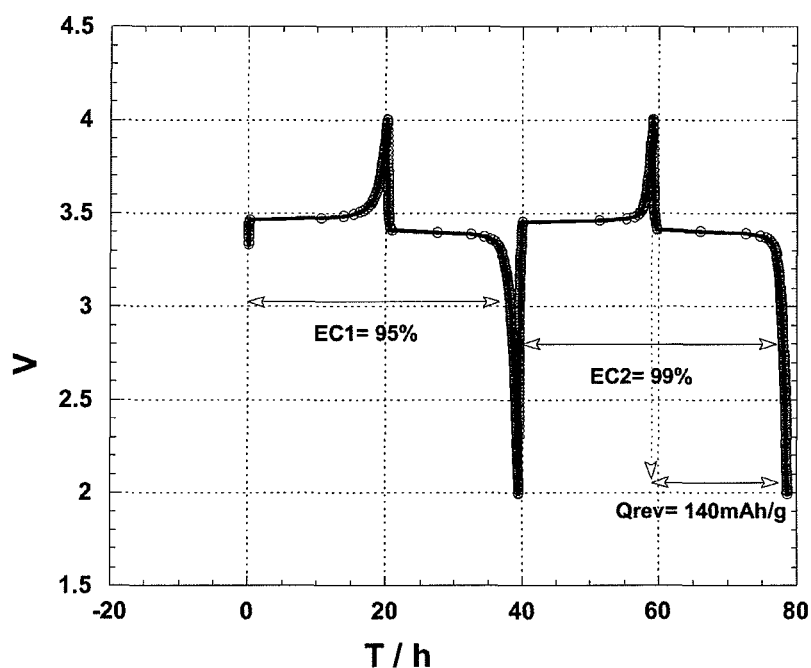
FIG. 5 shows the voltage profile V (in volts) as a function of charge-discharge time T (in hours) of the first and second cycles, for the prior art material of FIG. 4.

FIG. 5 shows the voltage profile as a function of charge-discharge time of the first and second cycles. This profile shows, at C/24:
 in the first cycle, the coulombic efficiency EC1 is 96%;
 in the second cycle, the coulombic efficiency EC2 is 100% and the reversible specific capacity Qrev is 141 mAh/g.

This example shows that the presence of a carbon coating on the $LiFePO_4$ particles and the presence of carbon coated carbon fibers instead of graphite particles and carbon black particles improve significantly the reversible specific capacity of a battery at a low discharge rate.

Example 4

Figure 6:
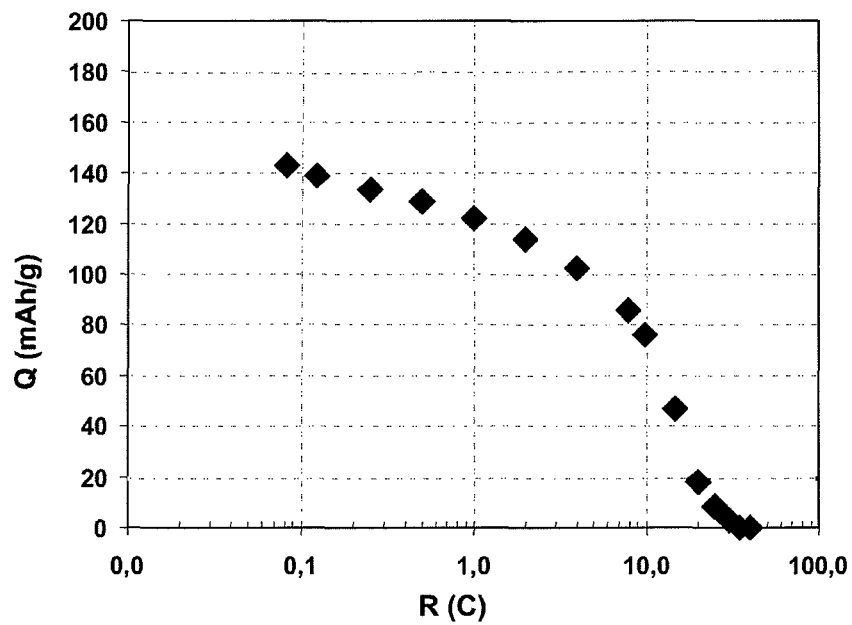
FIG. 6 shows the discharge capacity Q (in mAh/g) of the cell containing the material of FIG. 1, as a function of the discharge rate R(C).
Figure 7:
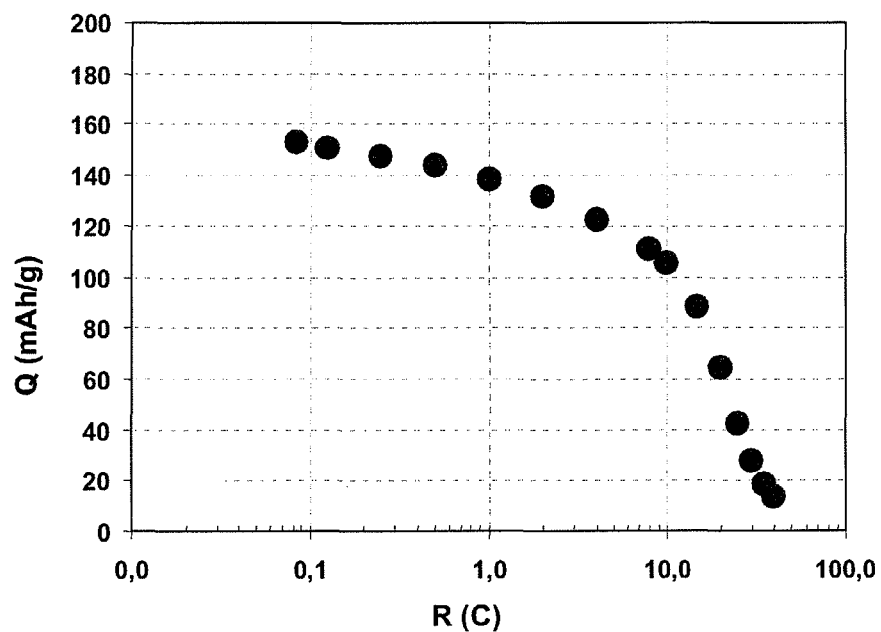
FIG. 7 shows the discharge capacity Q (in mAh/g) of the cell containing the material of FIG. 3, as a function of the discharge rate R(C).
Figure 8:
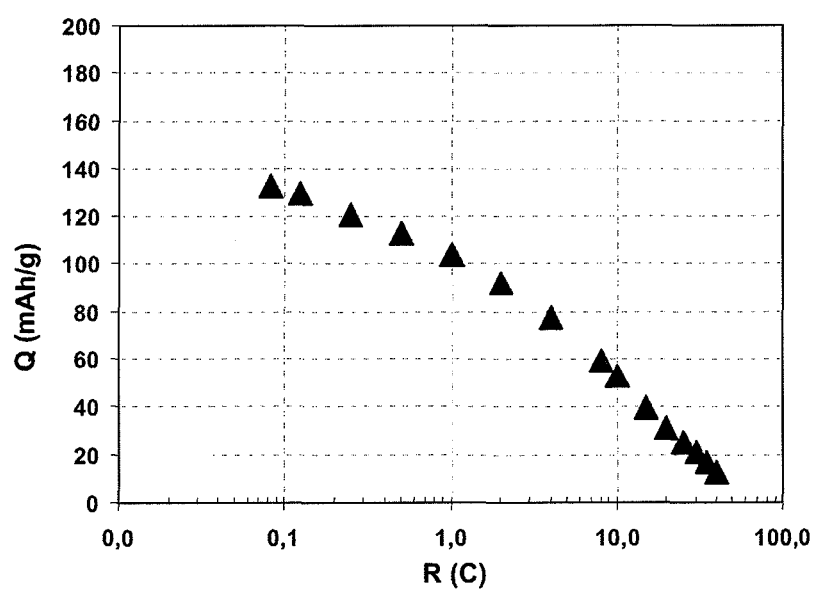
FIG. 8 shows the discharge capacity Q (in mAh/g) of the cell containing the material of FIG. 4, as a function of the discharge rate R(C).

Three coin cells, respectively assembled according to example 1, example 2 and example 3, were tested for the power performance, at high discharge rates. The respective discharge capacities of the cells are shown on FIGS. 6, 7 and 8. The specific capacities delivered at 1 C and 10 C rates for example are shown in the following table.

| Cell of | Discharge rate at 1 C | Discharge rate at 10 C | figure |
|---|---|---|---|
| Example 1 | 122 mAh/g | 76 mAh/g | 6 |
| Example 2 | 138 mAh/g | 105 mAh/g | 7 |
| Example 3 | 103 mAh/g | 53 mAh/g | 8 |

This example shows that the presence of a carbon coating on the $LiFePO_4$ particles and the presence of carbon coated carbon fibers instead of graphite particles and carbon black particles improves significantly the reversible specific capacity of a battery at a high discharge rate, which is requested for batteries where the power is important like batteries for hybrid vehicles and for plug in hybrid application.

The invention claimed is:
1. A composite material comprising carbon fibers and complex oxide particles, wherein the carbon fibers and the complex oxide particles have a carbon coating on at least part of their surfaces, said carbon coating being a non-powdery coating;
wherein the carbon coating on at least part of the surfaces of the carbon fibers and the complex oxide particle is obtained by a method comprising the steps of dissolving an organic carbon precursor in a solvent to obtain a carbon precursor solution, adding and mixing the complex oxide particles and the carbon fibers in the carbon precursor solution, and heat treating a resulting mixture at a temperature where the organic carbon precursor is carbonized, so as to bond the complex oxide particles to the carbon fibers and to one another via the carbon coating;
wherein the carbon fibers are bonded to the carbon coating by carbon-carbon bonding; and
wherein the thickness of the carbon coating on the complex oxide particles and on the carbon fibers is more than 0 nm and less than 100 nm.

2. The composite material of claim 1, which comprises 70-99.8% complex oxide, 0.1-20% carbon fibers and 0.1-10% carbon coating, all percentages being weight %.

3. The composite material of claim 1, wherein the complex oxides particles are nanosize particles supported by the carbon coated carbon fibers.

4. The composite material of claim 1, wherein the complex oxide corresponds to the general formula $A_aM_mZ_zO_oN_nF_f$ wherein A represents one or more alkaline metals, M represents one or more transition metals, and optionally at least one non-transition metal, or mixtures thereof, and Z represents one or more non-metallic elements, wherein $a \geq 0$, $m \geq 0$, $z \geq 0$, $o \geq 0$, $n \geq 0$ and $f \geq 0$, the coefficients a, m, o, n, f and z being selected to ensure electro neutrality.

5. The composite material of claim 4, wherein A represents lithium.

6. The composite material of claim 4, wherein M represents a transition metal element preferably selected from Fe, Mn, V, Ti, Mo, Nb, W, Zn and mixtures thereof, and optionally a non-transition metal.

7. The composite material of claim 4, wherein Z represents a non-metal selected from P, S, Se, As, Si, Ge, B and mixtures thereof.

8. The composite material of claim 1, wherein the complex oxide is selected from phosphate, oxyphosphate, silicate, oxysilicate, and fluorophosphate.

9. The composite material of claim 8, wherein the complex oxide is $LiFePO_4$.

10. The composite material of claim 1, wherein the carbon fiber consists of fiber filaments having a diameter of 1 to 200 nm and an aspect ratio (length/diameter) of 20 to 2000.

11. An electrode having an electrode material on a current collector, wherein the electrode material is a mixture of a composite material of claim 1 and of a binder.

12. An electrode of claim 11, wherein the binder is a fluorine-based polymer.

13. An electrode of claim 11, wherein the electrode material contains from 0.5 to 20 wt % vapor grown carbon fibers.

14. An electrode of claim 11, wherein the electrode material contains 0.5-5 wt % vapor grown carbon fibers, 70-95 wt % complex oxide and 1-25 wt % polymer binder, the total being 100%.

15. A rechargeable or non-rechargeable battery having an electrolyte which comprises a lithium salt and an anode made of lithium, a lithium alloy or a compound capable of reversibly exchanging lithium ions, wherein the cathode is an electrode according to claim 11.

16. An electrochemical cell, comprising at least one anode, one cathode and an electrolyte, wherein the cathode is an electrode according to claim 11.

17. The composite material of claim 1, wherein the organic carbon precursor is cellulose acetate.

18. A composite material comprising carbon fibers and complex oxide particles,
wherein the carbon fibers and the complex oxide particles have a carbon coating on at least part of their surfaces, said carbon coating being a non-powdery coating;
wherein the carbon coating on at least part of the surfaces of the carbon fibers and the complex oxide particle is obtained by a method comprising the steps of dissolving an organic carbon precursor in a solvent to obtain a carbon precursor solution, adding and mixing the complex oxide particles and the carbon fibers in the carbon precursor solution, and heat treating a resulting mixture at a temperature where the organic carbon precursor is carbonized, so as to bond the complex oxide particles to the carbon fibers and to one another via the carbon coating;
wherein the carbon fibers are bonded to the carbon coating by carbon-carbon bonding;
wherein the thickness of the carbon coating on the complex oxide particles and on the carbon fibers is more than 0 nm and less than 100 nm;
wherein the carbon fiber consists of fiber filaments having a diameter of 1 to 200 nm and an aspect ratio (length/diameter) of 20 to 2000; and
wherein the composite material comprises 70-99.8% complex oxide, 0.1-20% carbon fibers and 0.1-10% carbon coating, all percentages being weight %.

19. A method for the preparation of a composite material as claimed in claim 1, comprising mixing a complex oxide or precursors thereof, an organic carbon precursor and carbon fibers, and subjecting the mixture to a heat treatment in an inert or reducing atmosphere for the decomposition of the precursors.

20. The method of claim 19, wherein the mixture is prepared in an organic solvent, and the heat treatment comprises a first step of elimination of the solvent and a second step of decomposition of the precursors.

21. The method of claim 19, wherein the organic carbon precursor is a compound which are in liquid state, or a compound which is soluble in a solvent, or a compound which is in liquid state upon the decomposition heat treatment.

22. The method of claim 19, wherein the composite electrode material is prepared from a mixture containing the complex oxide precursors, the carbon fibers and the organic carbon precursor, wherein the complex oxide precursors, the organic carbon precursor and the carbon fibers are dissolved or homogeneously dispersed in a solvent, then the resulting homogeneous mixture is subjected to a first heat treatment at a temperature where the solvent is eliminated and to a second heat treatment at a temperature where the complex oxide precursors are reacted to form the complex oxide and the organic carbon precursor is carbonized.

23. The method of claim 19, wherein the composite electrode material is prepared from a mixture containing the complex oxide, the carbon fibers and the organic carbon precursor, wherein the complex oxide, the organic carbon precursor and the carbon fibers are dissolved or homogeneously dispersed in a solvent, then the solvent is eliminated by evaporation, and the resulting homogeneous mixture is subjected to heat treatment at a temperature where the organic carbon precursor is carbonized.

24. A method for preparing an electrode according to claim 11, wherein said method comprises:
- mixing a composite material, a binder and an organic solvent having a low boiling point, and
- applying the mixture thus obtained on a conductive support acting as the current collector, and eliminating the solvent by evaporation.

* * * * *